(12) United States Patent
Amirijoo et al.

(10) Patent No.: US 6,405,050 B1
(45) Date of Patent: Jun. 11, 2002

(54) SYSTEM, METHOD, AND APPARATUS FOR DISTINGUISHING BETWEEN DIFFERENT GROUP CALLS

(75) Inventors: Shahrokh Amirijoo, Richardson; Charles M. Feltner, Plano, both of TX (US)

(73) Assignee: Ericsson INC, Research Triangle Park, NC (US)

( * ) Notice: Subject to any disclaimer, the term of this patent is extended or adjusted under 35 U.S.C. 154(b) by 0 days.

(21) Appl. No.: 09/218,831

(22) Filed: Dec. 22, 1998

(51) Int. Cl.⁷ ................................................ H04Q 7/20
(52) U.S. Cl. ....................................... 455/518; 455/519
(58) Field of Search .................................. 455/518, 519, 455/445, 463, 550, 557, 415, 516, 521, 527; 370/330, 261, 384; 340/825.44, 825.36, 7.51, 3.55, 7.21, 7.22, 7.46, 825.65; 379/45, 265

(56) References Cited

U.S. PATENT DOCUMENTS

| | | | | |
|---|---|---|---|---|
| 5,251,250 A | * | 10/1993 | Obata et al. ................ 340/7.51 |
| 5,420,574 A | * | 5/1995 | Erickson et al. ....... 340/825.03 |
| 5,513,381 A | * | 4/1996 | Sasuta ........................ 455/509 |
| 5,634,196 A | * | 5/1997 | Alford .......................... 455/18 |
| 5,634,197 A | * | 5/1997 | Paavonen ................... 455/512 |
| 5,635,914 A | * | 6/1997 | Petreye et al. ......... 340/825.44 |
| 5,646,987 A | * | 7/1997 | Gerber et al. ................ 379/265 |
| 5,666,364 A | * | 9/1997 | Pierce et al. ................. 370/455 |
| 5,752,196 A | * | 5/1998 | Ahvenainen et al. ........ 455/518 |
| 5,754,960 A | * | 5/1998 | Downs et al. ............... 455/508 |
| 5,809,018 A | * | 9/1998 | Lehmusto .................... 370/330 |
| 5,835,860 A | * | 11/1998 | Diachina .................... 455/458 |
| 5,841,854 A | * | 11/1998 | Schumacher et al. ....... 379/265 |
| 5,930,723 A | * | 7/1999 | Heiskari et al. ............. 455/518 |
| 6,023,626 A | * | 2/2000 | Kinnunen et al. ........... 455/512 |
| 6,085,080 A | * | 7/2000 | Rahikainen et al. ........ 455/403 |
| 6,208,872 B1 | * | 3/2001 | Schmidt ..................... 455/518 |

\* cited by examiner

*Primary Examiner*—Dwayne Bost
*Assistant Examiner*—Jean A Gelin
(74) *Attorney, Agent, or Firm*—Jenkens & Gilchrist PC

(57) ABSTRACT

A system, method, and apparatus for transmitting and receiving group calls are illustrated. The group call register includes a counter value which identifies particular calls. The counter value is transmitted in the notification message, thereby identifying both the group and the group call. After the subscriber finishes listening to the group call, the subscriber can cause the mobile station to store the group identification number and the counter value in the group call history memory to prevent being alerted of the same group call in the event that the call is repeated. Additionally, the mobile station establishes a point-to-point call to an acknowledgment center and transmits the group identification number as well as the counter value. The group identification number and the counter value are stored in the acknowledgement center, thereby establishing a record of mobile stations that have listened to particular calls.

19 Claims, 4 Drawing Sheets

SYSTEM, METHOD, AND APPARATUS FOR DISTINGUISHING BETWEEN DIFFERENT GROUP CALLS

BACKGROUND AND OBJECTS OF THE PRESENT INVENTION

In addition to providing telephonic services, wireless telecommunications networks provide a number of supplementary services. One such service is a group call, wherein a member of a predefined group can set up a call to each member of the group. For example, in response to an emergency, a law enforcement dispatcher can notify law enforcement personnel of the emergency using a group call, where the law enforcement personnel are members of a common group.

Ordinarily, a group call is set up for each member of the group, regardless of their location. Therefore, a group conference could be established in which members are dispersed over a large area, which can be a disadvantage in the situation where the initiator of the group call needs to reach only the members of the group within a certain area. To limit the group call to a particular area, a list of cells in which members of the group are to be called is maintained. The list of cells are collectively known as the group call area. Members outside the group call area are not called. The list of cells is stored in a database that stores any number of group identification numbers, followed by identifiers of the particular cells in which members of the identified group are to be called.

When a group call is requested to be established by a mobile station belonging to a particular group, the list of cells in the group's group call area is retrieved. Within each cell of the group call area, a notification message is transmitted to each mobile station in the cell over a control channel. The notification alerts the mobile stations of the group call, identifies the group to receive the call, and identifies the traffic channel for the call. Subscribers at mobile stations belonging to the group are alerted and can then receive the group call by tuning to the indicated traffic channel.

In this methodology, group members outside the group call area are not called during a group call. However, where a large number of group members are only temporarily outside the group call area, it may be advantageous to call the group members upon their return to the group call area. Accordingly, to maximize the number of group members receiving the group call, the voice message is repeated several times on the traffic channel while the notification message is continuously transmitted over the control channel. In this manner, absent group members temporarily outside the group call area during one repetition of the group call are notified upon their return to the group call area. Although continuously transmitting the notification message and repeating the voice message maximizes the number of group members receiving the group call, the foregoing is annoying to group members who have already listened to one repetition of the voice message. Because the notification message is continuously transmitted during the repetition of the voice message, even mobile stations that have heard one repetition of the voice message are alerted by the notification message.

Another technique to maximize the number of group members receiving the group call is to have listening subscribers call an acknowledgment center to acknowledge the group call. For example, according to the Union Internationale des Chemins de Fer (UIC) MORANE specifications, for a GSM-Railway (GSM-R) system, an acknowledgment center in the network would record and process acknowledgments to group calls. Upon finishing the group call, the listening mobile station establishes a point-to-point call with the acknowledgment center to acknowledge listening to the group call. Although the acknowledgment center maintains records of mobile station which acknowledge listening to a group call, there is no mechanism for distinguishing which group call was listened to. The foregoing is especially problematic in situations where a particular group member, for example, a law enforcement dispatcher, makes frequent group calls on an ongoing basis.

Accordingly, it is an object of the present invention to provide a mechanism wherein a mobile station can ascertain whether an incoming group call has already been listened to by the mobile station.

It is also an object of the present invention to provide a mechanism whereby a group call initiator can determine which group members have listened to a particular group call.

SUMMARY OF THE INVENTION

The present invention is directed to a system, method, and apparatus for receiving a group call at a mobile station, wherein a notification message including a group identification number and a counter is detected on a control channel. When the notification message is received by a mobile station, the mobile station examines the counter and checks the contents of a group call history memory. Where the contents of the group call history memory include the counter value, the mobile station determines that the notification message is for a group call that was already received by the mobile station and is being retransmitted, and ignores the group call.

BRIEF DESCRIPTION OF THE DRAWINGS

The disclosed inventions will be described with reference to the accompanying drawings, which show sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
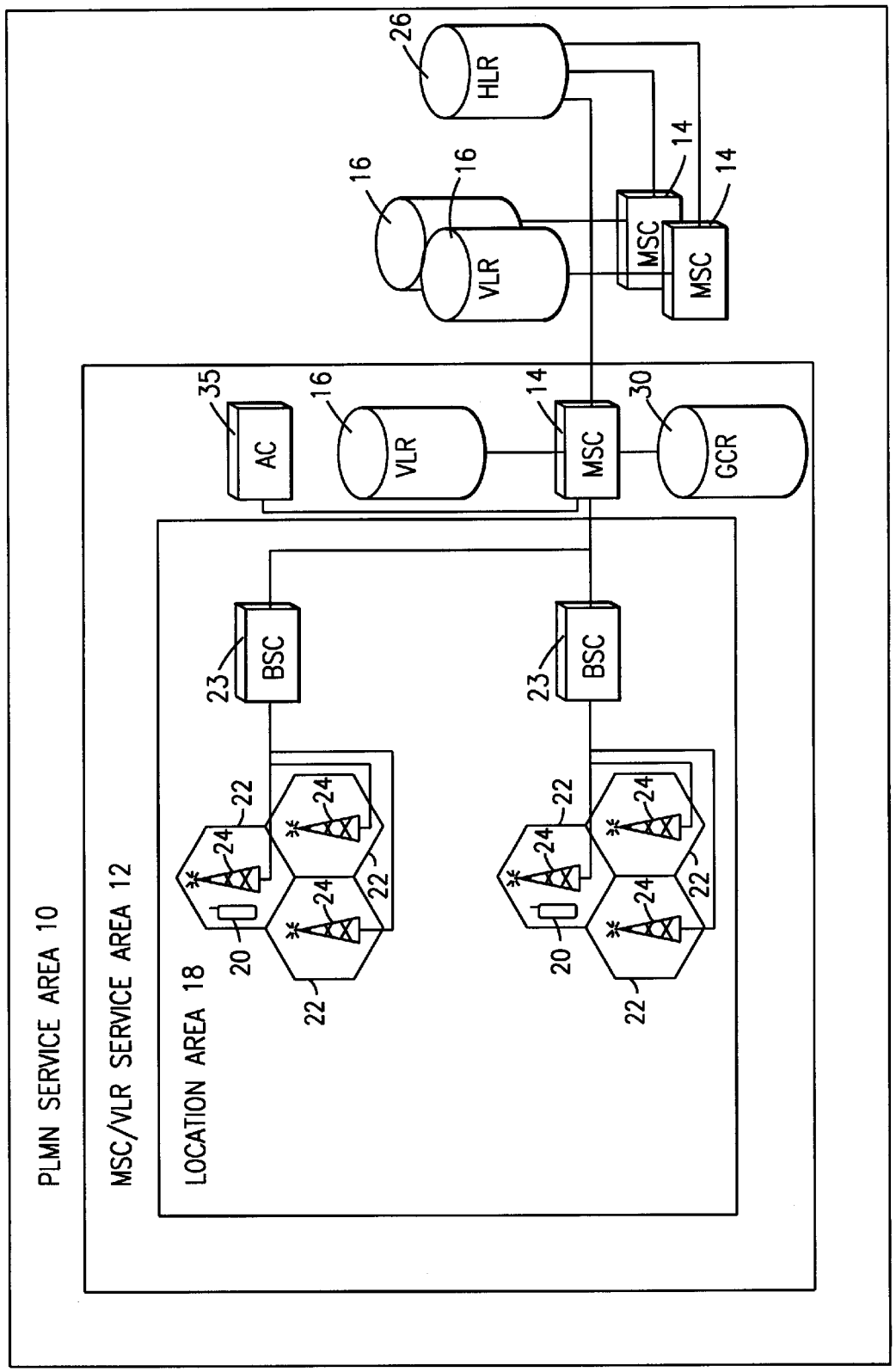
FIG. 1 is an exemplary wireless network embodying the present invention.

With reference now to FIG. 1 of the drawings, there is illustrated a GSM Public Land Mobile Network (PLMN), such as wireless network 10, which in turn is composed of a plurality of areas 12, each with a Mobile Services Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) 20 may move freely without having to send update location information to the MSC/VLR area 12 that controls the LA 18. Each Location Area 12 is divided into a number of cells 22. Mobile Station (MS) 20 is the physical equipment, e.g., a car phone or other portable phone, used by mobile subscribers to communicate with the wireless network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS 24 is the physical equipment, illustrated for simplicity as a radio tower, that provides radio coverage to the geographical part of the cell 22 for which it is responsible. It should be understood that the BSC 23 may be connected to several BTSs 24, and may be implemented as a stand-alone node or integrated with the MSC 14. In either event, the BSC 23 and BTS 24 components, as a whole, are generally referred to as a Base Station System (BSS).

With further reference to FIG. 1, the PLMN Service Area or wireless network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If a MS 20 roams into a new MSC/VLR area 12, the VLR 16 connected to that MSC 14 will request data about that Mobile Station 20 from its home HLR database 26 (simultaneously informing the HLR 26 about the current location of the MS 20). Accordingly, if the user of the MS 20 then wants to make a call, the local VLR 16 will have the requisite identification information without having to reinterrogate the home HLR 26. In the aforedescribed manner, the VLR and HLR databases 16 and 26, respectively, contain various subscriber information associated with a given MS 20.

Currently, additional subscriber services can be provided by adding an overlay to an existing cellular network 10. One such service is a group call, wherein a member of a predefined group can set up a call to each member of the group. For example, in response to an emergency, a law enforcement dispatcher can notify law enforcement personnel of the emergency using a group call, where the law enforcement dispatcher and personnel are members of a common group.

Ordinarily, a group call is set up for each member of the group, regardless of their location. Therefore, a group conference could be established in which members are dispersed over a large area which can be a disadvantage in the situation where the initiator of the group call needs to reach only the members of the group within a certain area. To limit the group call to a particular area, a Group Call Register (GCR) 30 maintains a list of cells 22 in which members of the group are to be called. The list of cells 22 are collectively known as the group call area. The GCR is a database that stores any number of group identification numbers, followed by identifiers of the particular cells 22 in which members of the identified group are to be called. Members outside the group call area are not called.

When a group call is requested to be established by a MS 20, the MSC 14 serving the MS 20 obtains a list of the cells to participate in the specific group call from the GCR 30. The MSC 14 then sends an assignment message for each cell 22, requesting the BSC 23 to establish a group call channel. For cells 22 outside the MSC/VLR service area 12, assignment messages are sent to the MSCs 14 serving the particular cells. Information about which BSC internal cells belong to the area of the group call are extracted from the assignment messages. MSCs 14 serving cells 22 outside the MSC/VLR service area 12 in which the group call is originated are known as relay MSCs.

The BSC 23 controls the radio resources allocated to the group calls. Once the BSC 23 establishes a group call channel, the BSC 23 sends notification messages to notify the group members of the group call and identify the group call channel. After receiving the notification message, the MS 20 belonging to group members can tune to the channel specified in the notification message, the group call channel. The group call channels for each BSC 23 are bridged together as one signal at the MSC 14.

Group members outside the group call area are not called during a group call. However, where a large number of group members are only temporarily outside the group call area, it may be advantageous to call the group members upon their return to the group call area. Accordingly, to maximize the number of group members receiving the group call, the voice message is repeated several times on the traffic channel while the notification message is continuously transmitted over the control channel. In this manner, absent group members temporarily outside the group call area during one repetition of the group call are notified upon their return to the group call area. Although continuously transmitting the notification message and repeating the voice message maximizes the number of group members receiving the group call, the foregoing is annoying to group members who have already listened to one transmission of the voice message. Because the notification message is continuously transmitted during the repetition of the voice message, even MS 20 that has heard one transmission of the voice message is alerted by the repetition notification message.

Another means to maximize the number of group members receiving the group call is by having the listening subscribers call an acknowledgment center 35 to acknowledge the group call. For example, according to the Union Internationale des Chemins de Fer (UIC) MORANE specifications, for a GSM-Railway (GSM-R) system, an acknowledgment center 35 in the network would record and process acknowledgments to group calls. Upon finishing the group call, the listening MS 20 establishes a point-to-point call with the acknowledgment center 35 to acknowledge listening to the group call. Although the acknowledgment center 35 maintains records of MS 20 which acknowledge listening to a group call, there is no mechanism for distinguishing which group call was listened to. The foregoing is especially problematic in situations where a particular group member, for example, a law enforcement dispatcher, makes frequent group calls on an ongoing basis.

To alleviate the foregoing problems, the present invention proposes the use of an identification tag to be appended to the group identification number, when the group identification number is transmitted during the notification message.

When a subscriber at MS 20 belonging to the indicated group finishes listening to an incoming group call, the subscriber can cause the MS to store the group identification number and the identification tag. After listening to the group call, the MS 20 automatically contacts the acknowledgment center 35 and transmits both the group identification number as well as the appended identification tag, which are stored in the acknowledgment center. The acknowledgment center 35 thereby records which MS 20 have listened to each particular group call.

If after one repetition of the voice message on the traffic channel, the voice message is repeated while the notification message continues to be transmitted over the control channel, the MS 20 will continue to receive the notification message. However, if the MS 20 has stored the group identification number and the identification tag, the MS 20 determines that the group call has already been listened to and ignores the notification message.

Figure 2:
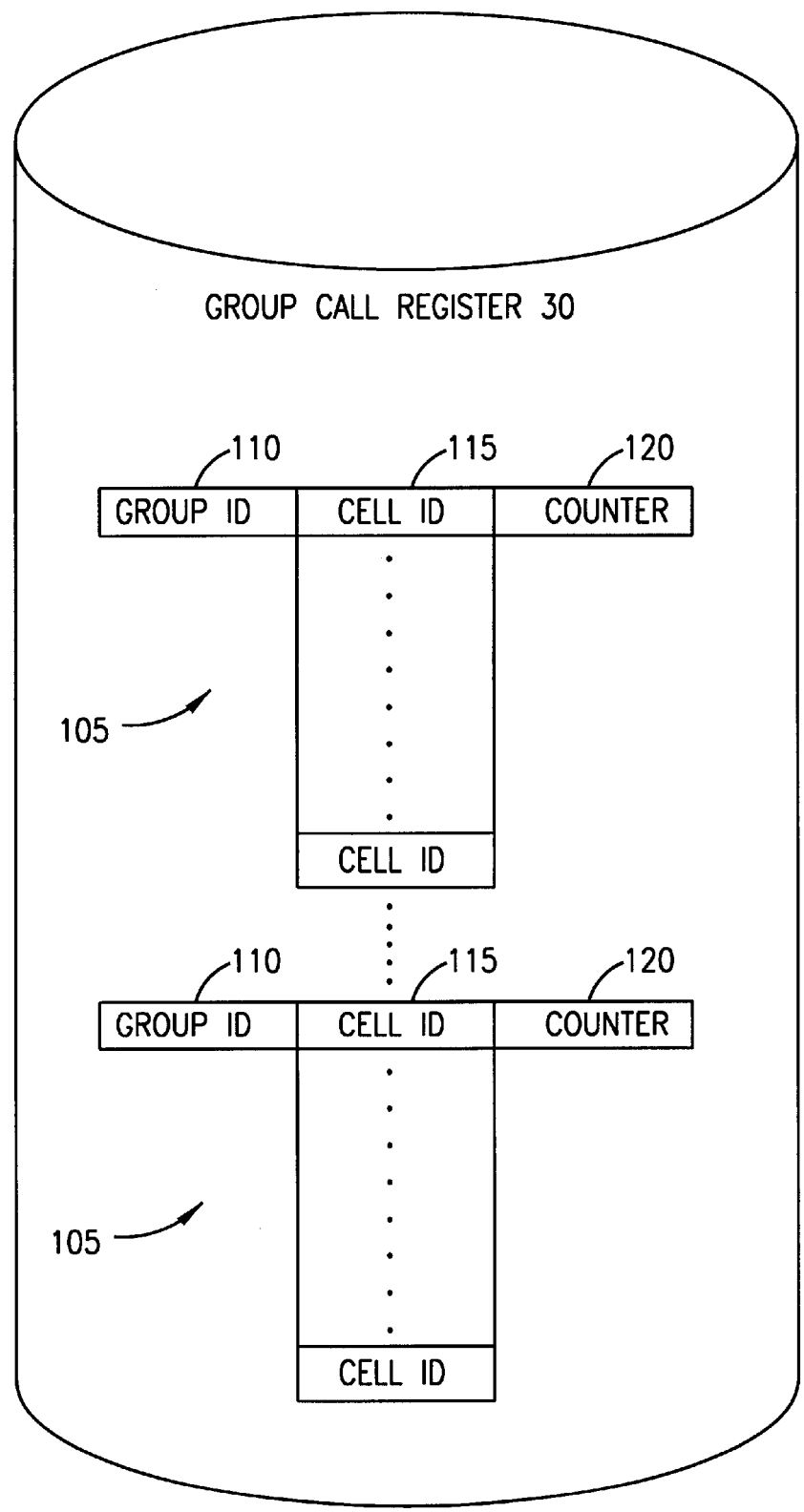
FIG. 2 is a group call register configured in accordance with the principles of the present invention.

Referring now to FIG. 2, there is illustrated a block diagram of a GCR 30 configured in accordance with the principles of the present invention. The GCR 30 is a database that stores any number of group records 105, wherein each group served by the MSC 14 is associated with a particular group record 105. Each group record includes an identifier of the associated group (group identification number) 110, followed by identifiers of the particular cells (cell identifiers) 115 making up the group call area.

The group record 105 also includes a counter 120 for keeping an ordinal count of each group call for the associated group. Each time a group call is made for a particular group, the MSC 14 retrieves the group record 105 associated with the group. Whenever the MSC 14 retrieves the group record 105, the counter is incremented 120, thereby keeping an ordinal count of each group call for the group.

The group record retrieved by the MSC 14 includes the value stored in the counter 120. The MSC appends the value stored in the counter 120 to the group identification number 110 and encapsulates the foregoing in an assignment message for each cell 22 requesting the BSC 23 to establish a group call channel. Once the BSC 23 establishes a group call channel, the BSC 23 sends notification messages which alert the MS 20 of the group call, identifies the group to receive the call using the group identification number 110, and identifies the traffic channel for the group call.

Also included in the notification message is the value that was stored in the counter when the MSC 14 retrieved the group record from the GCR 30. When a subscriber at MS 20 belonging to the indicated group finishes listening to an incoming group call, the subscriber can cause the MS to store the group identification number and the counter value. After listening to the group call, the MS 20 automatically contacts the acknowledgment center 35 and transmits both the group identification number as well as the counter value, which are stored in the acknowledgment center. The acknowledgment center 35 thereby records which MS 20 have listened to each particular group call.

If after one repetition of the voice message on the traffic channel, the voice message is repeated while the notification message continues to be transmitted over the control channel, the MS 20 will continue to receive the notification message. However, if the MS 20 has stored the group identification number and the counter value, the MS 20 determines that the group call has already been listened to and ignores the notification message.

Figure 3:
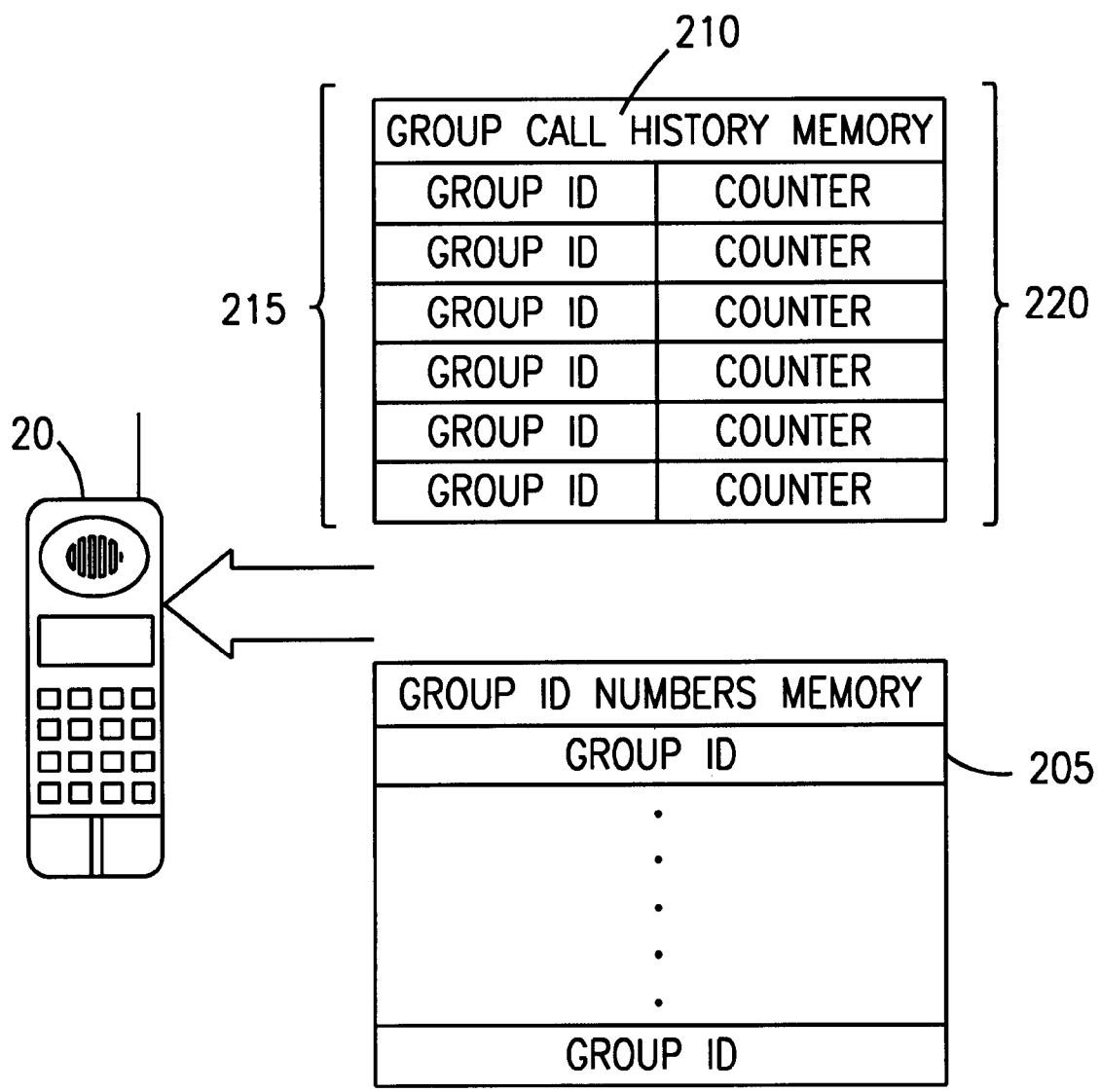
FIG. 3 is a mobile station configured in accordance with the principles of the present invention.

Referring now to FIG. 3, there is illustrated a block diagram of a MS 20 configured in accordance with the present invention. The MS 20 includes a group identification number memory 205 which stores a list of group identification numbers corresponding to the groups to which the MS 20 is a member. When the MS 20 receives a notification message from the BSC 23, the MS 20 compares the group identification number encapsulated in the notification message to the group identification numbers stored in the group identification number memory 205, to determine whether the MS 20 is a member of the identified group.

The MS 20 also includes a group call history memory 210 for storing the group identification number and the counter values. When a subscriber at MS 20 finishes listening to a group call, the subscriber can cause the group identification number and the counter value to be stored in the group call history memory 210. Those skilled in the art will recognize that the subscriber can request in a number of different ways that the group identification number and counter value be stored. In one embodiment, the MS 20 can include a special key (not shown) to be depressed at the completion of the group call. Responsive thereto, the MS 20 can store the group identification number and counter value in the group call history memory 210.

If after one repetition of the voice message on the traffic channel, the voice message is repeated while the notification message continues to be transmitted over the control channel, the MS 20 will continue to receive the notification message. However, if the MS 20 has stored the group identification number and the counter value in the group call history memory 210, the MS 20 determines that the group call has already been listened to and ignores the notification message.

The group call history memory 210 need only store the group identification numbers 215 and counter values 220 for a temporary period of time while the group call is transmitted. Because a group call is likely to be retransmitted over a relatively short period of time, for example, one hour, the group call history memory 210 can delete group identification numbers 215 and counter values 220 which have been stored for longer than one hour.

After the MS 20 completes receipt of a group call, the MS 20 establishes a point-to-point call to the acknowledgment center 35. During the call to the acknowledgment center 35, the MS 20 transmits the group identification number 215 and the counter value 220 that were stored immediately prior to receiving the group call. The foregoing are recorded in the acknowledgment center 35, thereby creating a record of each MS 20 which received a particular group call.

Figure 4:
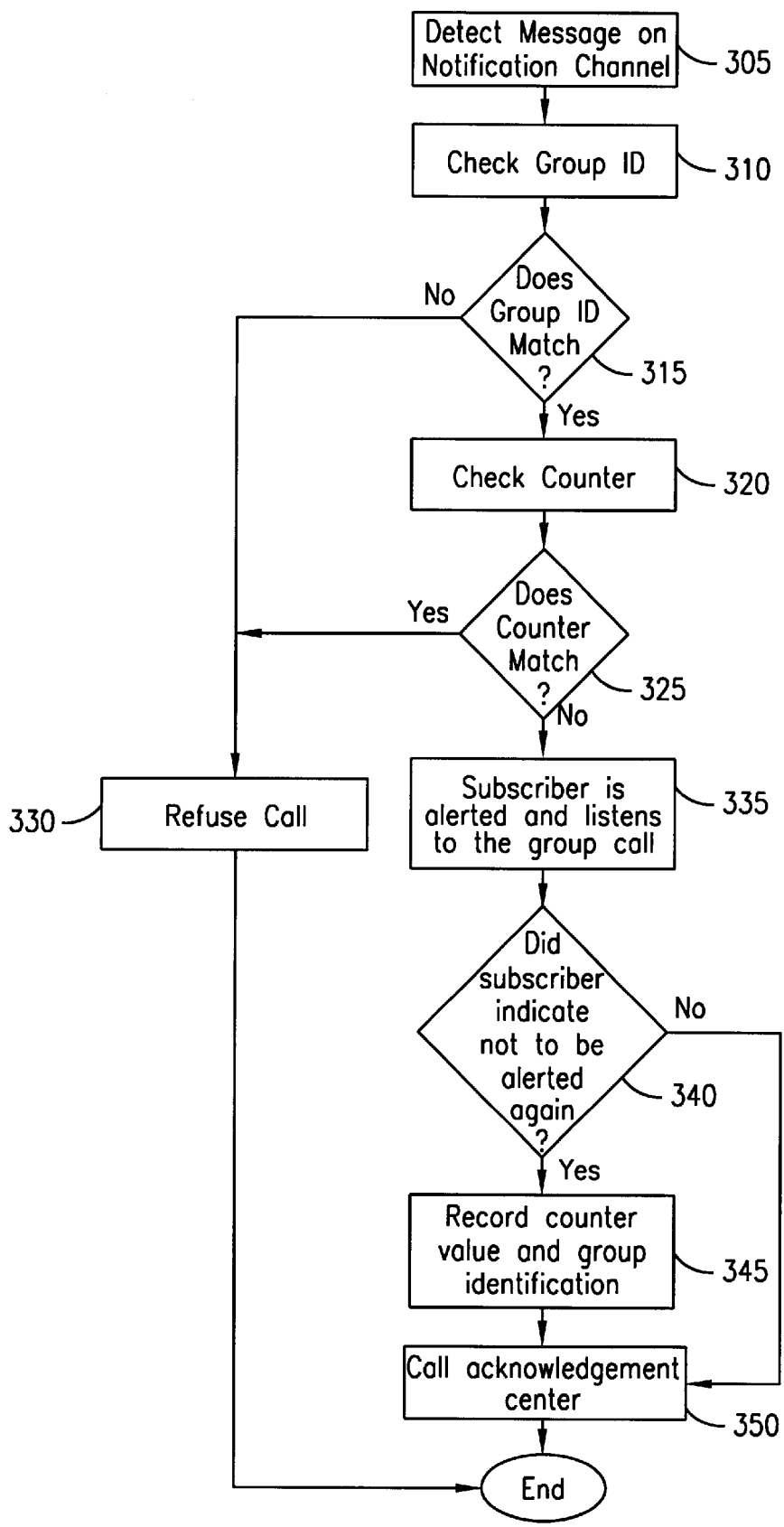
FIG. 4 is a flow diagram illustrating the operation of the mobile station in accordance with the principles of the present invention.

Referring now to FIG. 4, there is illustrated a flow diagram of exemplary steps demonstrating the operation of the MS 20 during a group call. At step 305, the MS 20 detects a notification message on the control channel. In response, the MS 20 examines the group identification number encapsulated in the notification message (step 310) and compares the group identification number encapsulated in the notification message to the group identification numbers stored in the group identification number memory 205 to determine (step 315) whether the MS 20 belongs to the group identified by the group identification number in the notification message.

Where the group identification number encapsulated in the notification message is found in the group identification number memory 205, the MS 20 determines that there is an incoming group call for a group to which the MS 20 belongs. To prevent alerting the subscriber for a group call that the subscriber has already listened to, the MS 20 then examines the group call history memory 210 (step 320) to determine whether the group identification number and the counter value encapsulated in the notification message are stored in the group call history memory 210 (step 325).

If the group identification number and the counter value are stored in the group call history memory 210, the MS 20 determines that although the group call is for a group which the MS belongs to, the notification message is for a group call which the subscriber has already listened to and chosen not to be alerted during repetitions of the voice message, and the MS 20 disregards the group call (step 330).

On the other hand, if the group identification number and the counter value are not stored in the group call history memory 210 (during step 325), the MS 20 alerts the subscriber and the subscriber listens to the group call (step 335). After the subscriber finishes listening to the group call, indicated by placing the MS 20 on-hook, the MS permits the subscriber for a limited time for the subscriber to direct the MS to ignore later repetitions of the group call (step 340). If within that time, the subscriber directs the MS 20 to ignore later repetitions of the group call, the MS stores the group identification number and the counter value in the group call history memory 210 (step 345). By storing the group identification number and the counter value in the group call history 210, if the MS 20 continues to receive the notification message for the same group call, the MS 20 ignores the notification message. If during step 340, the subscriber does not direct the MS 20 to ignore later repetitions of the group call, step 345 is bypassed and if the MS 20 continues to receive the notification message, the MS 20 alerts the subscriber. After the MS 20 has completed the group call, the MS 20 calls the acknowledgment center 35 (step 350) during which MS 20 transmits the group identification number and the counter value stored in the group call history memory 210 which are stored by the acknowledgment center.

As will be recognized by those skilled in the art, the innovative concepts described in the present application can be modified and varied over a wide range of applications. For example, instead of using a counter to identify the group call, a time stamp at the MSC can be used. Accordingly, the scope of patented subject matter should not be limited to any of the specific exemplary teachings discussed, but is instead defined by the following claims.

What is claimed is:

1. A method for receiving a group call at a mobile station, said method comprising the steps of:

detecting a notification message on a control channel, said notification message comprising a first indicator identifying a particular group, and a second indicator and a counter value identifying said group call;

examining said second indicator and the counter value;

examining contents of a group call history memory forming a portion of said mobile station; and rejecting a subsequent group call as having already been received if said contents of said group call history memory include said examined second indicator and the counter value.

2. The method of claim 1, further comprising the steps of:

examining said first indicator identifying said particular group; and examining the contents of a group identification number memory forming a portion of said mobile station; and rejecting said group call if said contents of said group identification number memory do not comprise said first indicator identifying said particular group.

3. The method of claim 1, further comprising the step of:

receiving said group call if said contents of said group call history memory do not include said examined second indicator.

4. The method of claim 3, wherein said step of receiving said group call further comprises the step of:

storing said second indicator in said group call history memory.

5. The method of claim 3, wherein said step of receiving said group call further comprises the steps of:

establishing a call to an acknowledgment center; and transmitting said first indicator and said second indicator from said mobile station to said acknowledgment center.

6. A mobile station for receiving group calls, said mobile station comprising:

a group call history memory for storing first indicators and counter values, each one of said first indicators identifying a particular group call;

detection means for detecting a notification message on a control channel, said notification message comprising a first identifier and a counter value identifying a particular group call; and rejecting means for rejecting a subsequent group call as having already been received if the first indicator and the counter value of said group call history memory matches one of said first indicators and counter values.

7. The mobile station of claim 6, further comprising:

a group identification number memory for storing second indicators, each one of said second indicators identifying a particular group;

wherein said notification message further comprises a second identifier identifying a particular group; and wherein said rejection means rejects said group call when said second identifier does not match one of said second indicators in the group identification number memory.

8. The mobile station of claim 7, wherein said group call history memory further comprises:

storing means for storing said first identifier if said first identifier does not match one of said first indicators and said second identifier matches said second indicators.

9. The mobile station of claim 7, further comprising:

call establishing means for establishing a call to an acknowledgment center; and transmission means for transmitting said first identifier and said second identifier from said mobile station to said acknowledgment center.

10. A group call register, said group call register comprising:

a plurality of group identification numbers, each one of said plurality of group identification numbers identifying a particular group;

a plurality of cell identifiers, each one of said plurality of cell identifiers identifying a particular cell, wherein a portion of said plurality of cell identifiers are associated with each of said plurality of group identification numbers; and a plurality of indicators identifying a particular group call, wherein each of said plurality of indicators is associated with a particular group identification number of said plurality of group identification numbers, each of said plurality of indicators comprising a counter that is configured to identify the number of times the particular group call has been previously transmitted.

11. The group call register of claim 10, further comprising:
   incrementing means for incrementing the counter, responsive to establishing group call by a particular group identified by said one of said plurality of group identification numbers associated with said counter.

12. A method for transmitting a group call to mobile stations within a group, said method comprising the steps of:
   receiving a request to establish a group call from a mobile station associated with a particular group;
   retrieving a record from a group call register, said record comprising one or more cell identifiers identifying one or more cells forming a group call area;
   retrieving counter information from said group call register, said counter information comprising a counter identifying the number of times the group call has been transmitted;
   encapsulating a group identification number and a group call identifier in a notification message, said group call identifier identifying said group call; and
   transmitting said notification message to a plurality of mobile stations.

13. The method of claim 12, wherein said step of transmitting further comprises the step of:
   transmitting said notification message over a control channel in each of said one or more cells forming said group call area.

14. The method of claim 12, wherein said step of encapsulating further comprises the step of:
   encapsulating said group identification number and said counter information in the notification message.

15. The method of claim 14, further comprising the step of:
   incrementing said counter, responsive to said step of retrieving said record.

16. The method for a subscriber to handle a notification message which is in the form of a group call to a particular group of subscribers, said group call being associated with a group call register, said method comprising the steps of:
   establishing a counter value relating to each notification message, said notification message identifying the group and the group call;
   establishing a group call history to create stored information relating to the group and the group call for each notification message which has already been received by a specific subscriber;
   searching said stored information to find out if a subsequent group call to said specific subscriber is a repeat; and
   if affirmative, ingnoring the subsequent group call.

17. The method according to claim 16, further comprising the step of:
   establishing a call with an acknowledgment center to acknowledge listening to the group call if the group call is not a repeat, said establishing said call increments said counter value.

18. The method according to claim 16, wherein the stored information relating to the group and the group call for each notification message is stored for a predetermined amount of time.

19. The method according to claim 16, wherein if said step of searching said stored information to find out if said subsequent group call is a repeat is not affirmative, said method further comprises the step of:
   storing information related to the group and the group call of the notification messages not previously received in said group call history, thus indicating in further searching that said notification message has been received.

* * * * *

UNITED STATES PATENT AND TRADEMARK OFFICE
CERTIFICATE OF CORRECTION

PATENT NO. : 6,405,050 B1
DATED : June 11, 2002
INVENTOR(S) : Amirijoo et al.

It is certified that error appears in the above-identified patent and that said Letters Patent is hereby corrected as shown below:

<u>Column 10,</u>
Line 1, replace "The method" with -- A method --
Line 16, replace "ingnoring" with -- ignoring --

Signed and Sealed this

First Day of October, 2002

Attest:

Attesting Officer

JAMES E. ROGAN
*Director of the United States Patent and Trademark Office*